United States Patent [19]

Abbott et al.

[11] 4,120,001
[45] Oct. 10, 1978

[54] SYSTEM FOR PASSING TWO COLOR TV SIGNALS THROUGH NON-LINEAR PATH

[75] Inventors: Liston Abbott, Hightstown; Guy Ward Beakley, Princeton Junction; Robert Earl Flory, Princeton, all of N.J.

[73] Assignee: RCA Corporation, New York, N.Y.

[21] Appl. No.: 751,795

[22] Filed: Dec. 17, 1976

[51] Int. Cl.² .............................................. H04N 9/00
[52] U.S. Cl. ...................................... 358/11; 358/12; 358/37
[58] Field of Search ...................... 358/11, 12, 15, 16, 358/23, 35, 36, 37

[56] References Cited
PUBLICATIONS

Electronics, pp. 97-108, Mar. 22, 1965.

Primary Examiner—Robert L. Richardson
Attorney, Agent, or Firm—H. Christoffersen; Samuel Cohen; Carl V. Olson

[57] ABSTRACT

When two color television signals are transmitted over a common non-linear path, such as a transponder in a communications satellite, the two color subcarriers at slightly different frequencies intermodulate each other and produce a disturbing flickering of color on the screens of monitors and receivers. The crosstalk is made invisible in the present system by translating the flicker to fluctuations occurring at too high a frequency to be seen. At the transmitting terminal, alternate lines of one of the television video signals are delayed by half the period of the color subcarrier, and at the receiving terminal, intermediate lines of the same television video signal are delayed by half the period of the subcarrier. The fluctuations may be made invisible to signal-monitoring instruments by passing both the delayed and undelayed television video signals through chroma averaging circuits at the receiving terminal.

5 Claims, 7 Drawing Figures

ALTERNATE LINE DELAY CIRCUIT

SYSTEM FOR PASSING TWO COLOR TV SIGNALS THROUGH NON-LINEAR PATH

This invention relates to systems for the transmission of two color television signals over a common non-linear path. The invention is especially useful in systems in which a plurality of different color television signals are transmitted from a ground station to a satellite in which the signals are amplified and then returned to a ground station remote from the transmitting ground station. The receiving ground station may forward the television signals to nearby television transmitting stations which broadcast to television receivers in a local area of about 50 miles radius.

The amplifiers in the transponders in the satellites are traveling-wave-tube amplifiers because they are light in weight, use a minimum of electric power and have high gain. The requirements are such that the amplifiers cannot be made to have a linear amplification characteristic. This is not a serious disadvantage because normally only one color television signal is amplified in each transponder. However, when it is desired to amplify two color television signals in a single transponder, the color subcarriers of the two signals cross modulate each other in the non-linear traveling wave tube amplifier. The color subcarriers in NTSC video signals from different sources may differ from the standard frequency of 3.58 MHz by any amount up to 10 Hz, and thus may differ from each other by up to 20 Hz. The cross modulation of cross talk in the transponder of the two subcarriers results in a visible disturbing color flicker on the screens of television monitors and receivers.

In accordance with an embodiment of the invention, the color flicker on the screen of a monitor or receiver is made invisible to the human eye by delaying alternate lines of one of the two video signals by half the period of the color subcarriers at the transmitting terminal, and by delaying intermediate lines of the same one of the two video signals by half the period of the color subcarrier at the receiving terminal. Both the delayed and undelayed video signals at the receiving terminal may be passed through chroma averaging circuits to make the color flicker invisible to signal-monitoring instruments.

Figure 1:
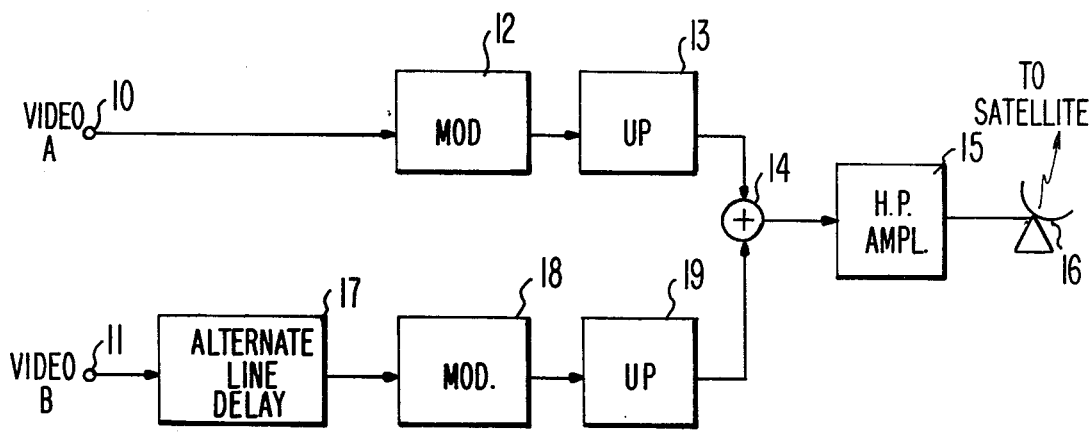
FIG. 1 is a block diagram of equipment at a ground station for transmitting two television signals up to a repeater satellite.

Referring now to the transmitting equipment in FIG. 1, one NTSC composite video television signal A is applied to an input terminal 10, and another NTSC composite video television signal B is applied to an input terminal 11. Video signal A is used to frequency modulate a carrier wave in modulator 12. The output of the modulator is translated up in unit 13 to a higher frequency, such as one in the 6 GHz range, which is passed through a signal adder 14 and a high-power (H.P.) amplifier 15 feeding an antenna 16 pointed to a repeater satellite (not shown). The other video signal B is applied from input terminal 11 through an alternate line delay circuit 17 before being applied through a modulator 18 (like modulator 12) and an up converter 19 to the signal adder 14. The signal outputs of the up converters 13 and 19 each occupy a different half of the frequency range passed by the amplifier 15 and the transponder in the satellite. A suitable alternate line delay circuit is shown in detail in FIG. 3.

Figure 2:
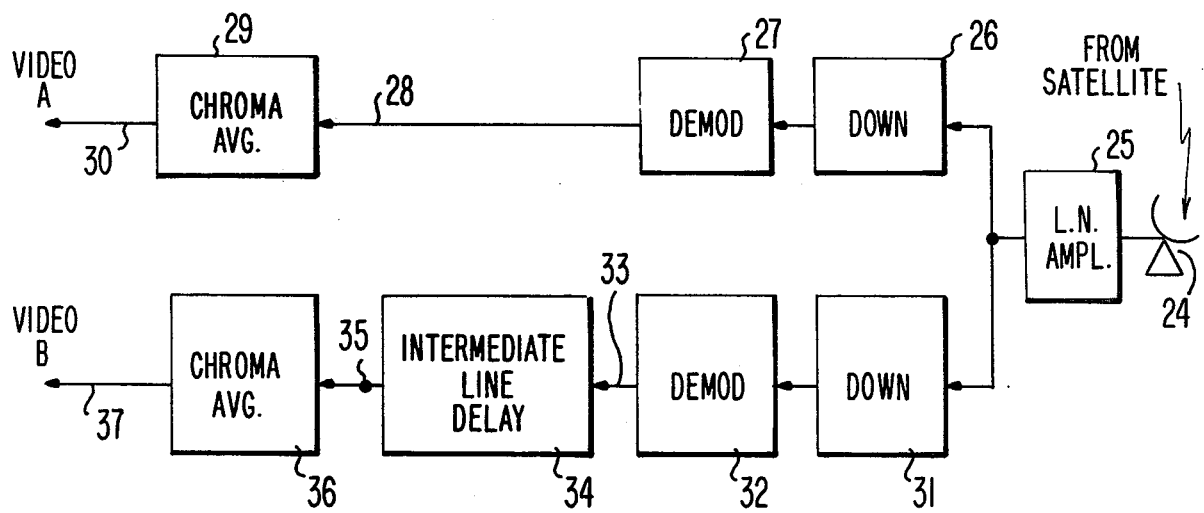
FIG. 2 is a block diagram of equipment at a remote ground station for receiving the two television signals from the satellite.

The receiving equipment shown in FIG. 2 is at a remote location on the earth and has an antenna 24 for receiving the combined television signal relayed from the satellite at a frequency such as 4 GHz. The received signal is passed through a low-noise-amplifier 25, and then divided on the basis of frequency into two paths, one of which is an A-signal path including a frequency down converter 26, a demodulator 27 and a chroma averaging circuit 29 to an output line 30 carrying the NTSC composite video signal A originally supplied to terminal 10 in FIG. 1. The other B-signal path includes a frequency down converter 31, a demodulator 32, an intermediate line delay circuit 34, and a chroma averaging circuit 36 connected to an output line 37 carrying the NTSC composite video signal originally supplied to terminal 11 in FIG. 1.

Figure 3:
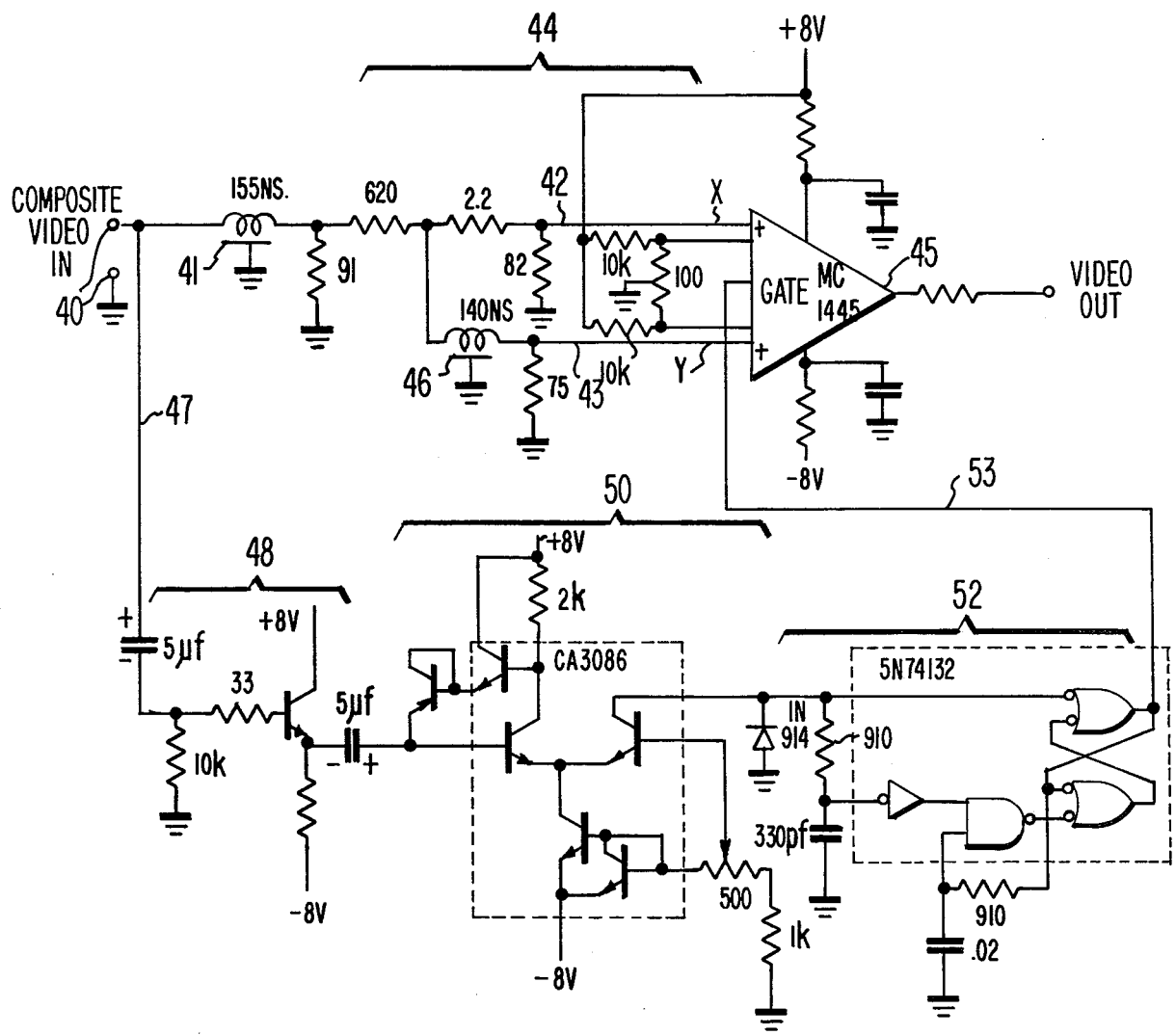
FIG. 3 is a schematic diagram of a line delay circuit which may be employed in the transmitting and receiving equipments of FIGS. 1 and 2.

The alternate line delay unit 17 in FIG. 1 and the intermediate line delay unit 33 in FIG. 2 may both be constructed as shown in FIG. 3. A composite video signal input terminal 40 is coupled through a 155-nanosecond delay unit 41 and through two paths 42 and 43 of an attenuating and impedance matching network 44 to two respective input terminals X and Y of a switching amplifier 45. The path to input terminal Y includes a 140-nanosecond delay unit 46 which delays the video signal an amount equal to a half cycle of the color subcarrier having a frequency of 3.58 MHz.

The delay unit 41 is provided for the purpose of compensating for the delay introduced by gate generator circuits in path 47 including an emitter follower 48, a sync clamp and stripper 50 and an alternate line gate signal generator 52 having an output connected over line 53 to the "gate" input of the switching amplifier 44. The alternate line gate circuit 52 responds to the composite sync signal from circuit 50 to produce a gate signal on line 53 which causes the switch amplifier 45 to pass alternate horizontal lines of the video signal delayed by delay unit 46 and applied to input Y of switching amplifier 45, and to pass intermediate horizontal lines of the undelayed video signal applied to input X of the switching amplifier 45.

The alternate line gate signal from generator 52 is also characterized in being asymmetrical so that all horizontal synchronizing pulses appearing at the output of switching amplifier 45 are from the undelayed video signal applied to input terminal X of the switch 45. The alternate horizontal lines delayed by delay device 46 and passed through switch 45 include solely the video horizontal line signals existing between the horizontal synchronizing pulses. Alternate video horizontal lines are delayed, but alternate horizontal pulses are not delayed. This arrangement prevents the horizontal synchronizing pulses appearing at the output of switching amplifier 45 from being alternately delayed and undelayed, a condition which would interfere with horizontal synchronization of pictures on the faces of TV monitors and receivers to which the output video signal might be applied.

The circuit of FIG. 3 used as the alternate line delay circuit 17 in the transmitting system of FIG. 1, may be used, with a slight modification, as the intermediate line delay circuit 34 in the receiving system of FIG. 2. The modification consists of transposing the connections to the inputs of switching amplifier 45 so that path 42 is connected to input Y, and signal-delaying path 43 is connected to input X. The result of this transposition at the receiver of FIG. 2 is to delay the horizontal lines which were not delayed in the transmitter of FIG. 1. Stated another way, the unit 17 in FIG. 1 delays alternate horizontal lines, and the unit 34 in FIG. 2 delays intermediate horizontal lines. All horizontal lines are delayed once before being applied to a color TV monitor or receiver. If the intermediate line delay unit 34 is omitted from FIG. 2, there will be a humanly visible cancellation of the chrominance signal due to an addition of 180°-out-of-phase color subcarriers on adjacent horizontal lines of monitors and receivers.

Figure 4:
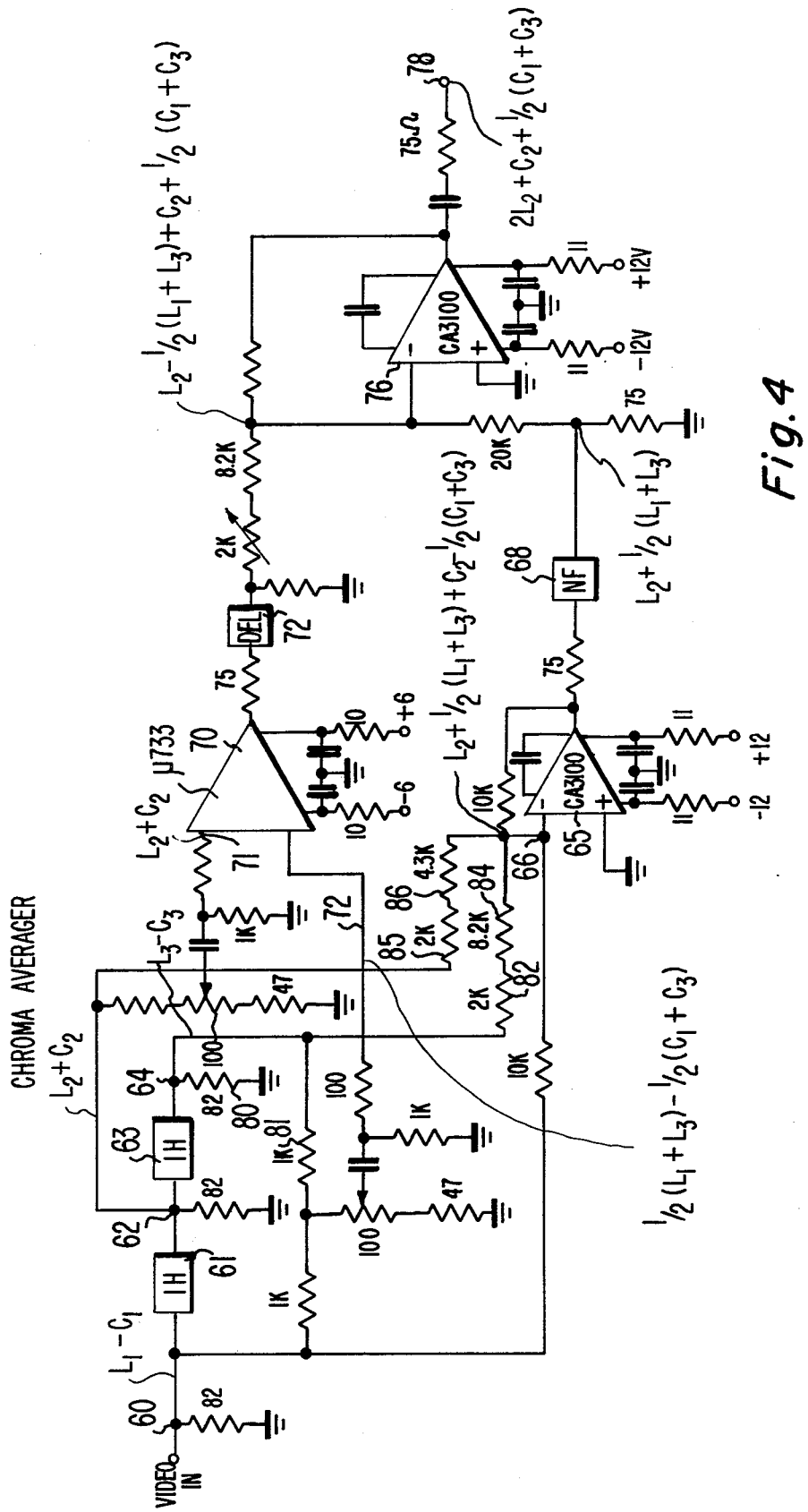
FIG. 4 is a schematic diagram of a chroma averaging circuit which may be employed in the receiving equipment of FIG. 2.

The chroma averagers 29 and 36 in the receiving system of FIG. 2 may be constructed as shown in FIG. 4. The circuit in FIG. 4 accepts three successive horizontal lines of video which may be represented as $L_1-C_1$, $L_2+C_2$ and $L_3-C_3$, where L is the luminance portion of the video signal, and C is the chrominance portion of the signal. $L_3-C_3$ is the first received line, and $L_1-C_1$ is the last received one of the three lines.

There is a polarity change in the chrominance signal C from one point on a horizontal line to the same point on the next horizontal line. This is inherent in the National Television System Committee (NTSC) color television signal standards adopted by the United States and other countries. The polarity reversal results from the use of $455 \div 2 = 227.5$ subcarrier cycles per horizontal line. This type of polarity or phase reversal between points on successive lines of the same television video signal is not represented in the simplified vector diagrams of FIGS. 5, 6 and 7; and is not to be confused with the phase reversal produced by the alternate line delay unit 17 in the video B channel in the transmitter of FIG. 1, and is then effectively cancelled in the intermediate line delay unit 34 in the receiver of FIG. 2. This latter phase reversal of one video signal B while in the satellite transponder with a non-reversed video signal A permits a substantial cancellation of the cross modulation of one video signal by the other.

In FIG. 4 the video signal is applied from input terminal 60 through a one-H (one horizontal line) delay unit 61, a terminal 62, and through a second one-H delay unit 63 to a terminal 64. At the time when video signal for one line $L_1-C_1$ is present at 60, the video signal $L_2+C_2$ for the previous line is present at 62, and the video signal $L_3-C_3$ for the line before that is present at 64. An operational amplifier 65 has an input terminal 66 coupled to receive $\frac{1}{2}(L_1-C_1)$ from point 60, $\frac{1}{2}(L_3-C_3)$ from point 64, and $L_2+C_2$ from point 62. The sum of these three signals may be arranged as $L_2 + \frac{1}{2}(L_1+L_3) + C_2 - \frac{1}{2}(C_1+C_3)$. This signal from amplifier 65 is passed through a chroma trap 68 to remove the terms $C_2 - \frac{1}{2}(C_1+C_3)$.

A subtractor differential amplifier 70 has one input 71 coupled to receive $L_2+ C_2$ from point 62 and has a subtractor input 72 coupled to receive $\frac{1}{2}(L_1+L_3) - \frac{1}{2}(C_1+C_3)$ from points 60 and 64. The difference output of subtractor 70 is passed through a delay unit 72 having a delay equal to the delay caused by trap 68.

An operational amplifier 76 amplifies the combined outputs of the notch filter 68 and the delay unit 72 and produces a sum output at 78 equal to $2L_2 + C_2 + \frac{1}{2}(C_1+C_3)$, or $2(L_2 + C_{avg})$, which is a composite video signal consisting of the luminance component of one horizontal line together with a weighted average chrominance component of three horizontal lines.

The chroma averagers 29 and 36 in FIG. 2 alternatively may be constructed to provide the luminance component of one line together with the average chrominance component of two horizontal lines. This can be accomplished with a circuit as shown in FIG. 4 with circuit elements 63, 80, 81, 82, and 84 omitted, and with resistors 85 and 86 replaced by one 10K resistor. The resultant output at 78 is then $2(L_2 + \frac{1}{2}(C_1+C_2))$.

FIG. 1 shows ground station equipment for transmitting to and through one transponder channel in a satellite to ground station receiving equipment shown in FIG. 2. Each satellite includes many transponder channels, and each transtransponder channel may have a frequency bandwidth of 36 MHz which is normally used exclusively for relaying one television channel signal in the form of a frequency-modulated radio-frequency carrier. When the carrier is frequency modulated over a range of frequencies equal to the 36 MHz bandwidth of the transponder, the signal-to-noise ratio of the entire system is very good.

However, it is practical and desirable to use a single transponder channel in the satellite for two television channel signals. This is done by using the lower half of the 36 MHz bandwidth for one TV signal A, and the upper half of the bandwidth for a second TV signal B. The two frequency-modulated radio-frequency carriers carrying the two TV signals are each deviated about half as much as the single carrier used when a transponder handles only one TV signal, but the system signal-to-noise ratios of the two TV signals is reasonably high (e.g., 48 db. CCIR weighted), and the resulting TV pictures on the screens of monitors and receivers are of good quality. However, the 3.58 MHz color subcarriers of the two TV signals normally differ by an amount from zero to 20 Hz, and the two subcarriers cross modulate each other in the non-linear satellite transponder. This results in a color flicker at a rate up to 20 Hz on the screens of monitors and receivers. The color flicker is rendered invisible to the human eye by the alternate line delay unit 17 in the transmitting equipment of FIG. 1 and the intermediate line delay unit 33 in the receiving equipment of FIG. 2.

Figures 5, 6, 7:
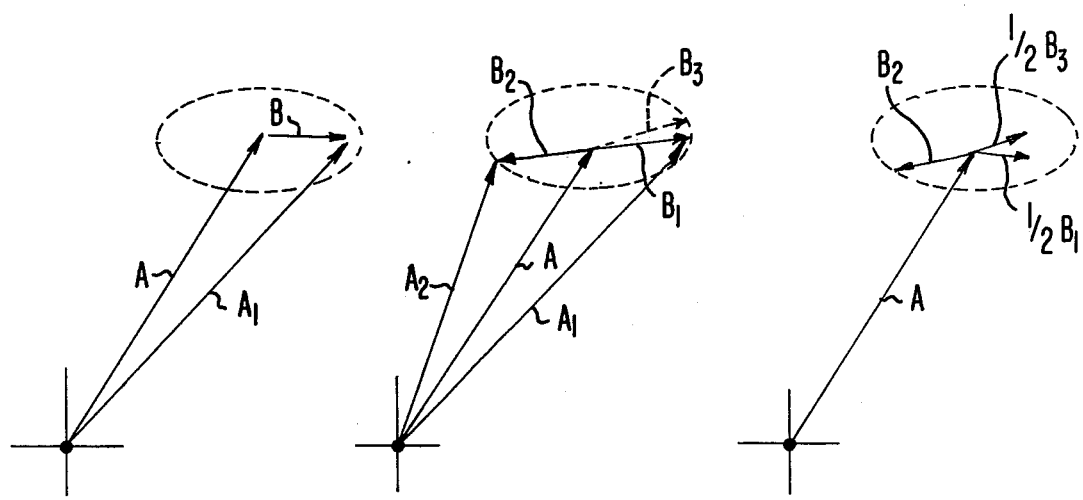
FIG. 5 is a vector diagram representing modulation of one television signal color subcarrier by another television color subcarrier in a satellite transponder.
FIG. 6 is a vector diagram which will be referred to in describing how intermodulation of color subcarriers is made invisible on television monitors and receivers.
FIG. 7 is a vector diagram which will be referred to in describing the operation of the chroma averaging circuits in FIGS. 1 and 2.

FIG. 5 is a vector diagram in which the vector A represents the color subcarrier of the received video signal A at point 28 in FIG. 2, and vector B represents the cross talk on vector A due to intermodulation in the satellite transponder of the color subcarrier of the signal B. The vector B rotates around the arrow tip of vector A at the very slow rate of from zero to 20 Hz which is equal to the frequency difference of the two color subcarriers. The dotted line representing the path of the arrowhead of vector B may be a circle but is more likely an ellipse because of various distorting effects. $A_1$ is the resultant of A and B at the instant shown. It can be seen that the resultant $A_1$ will fluctuate in amplitude and phase by the amount B at a slow and disturbing rate and cause color flutter on TV screens.

The flutter is rendered invisible by delaying alternate horizontal lines of the video signal B in alternate line delay unit 17 in FIG. 1. Signal B is delayed 140 nanoseconds which is equal to half the period of the 3.58 MHz color subcarrier. FIG. 6 shows how the vector $B_2$ for the horizontal line following the line of vector $B_1$ is delayed a half period (reversed in phase). The resultant vector $A_2$ is different in amplitude and phase from resultant $A_1$. During the next following horizontal line, the vector $B_3$ occurs very near vector $B_1$, and the resultant of A and $B_3$ is very near resultant $A_1$. The change from resultant $A_1$ to $A_2$ and back to near resultant $A_1$ occurs at the horizontal scanning rate of 15,734 Hz, and thus the fuctuations are not visible on a TV receiver supplied with a composite video signal A as produced at point 28 in the receiving equipment of FIG. 2.

The cross talk in TV signal A caused by TV signal B shown in FIG. 6 is similar to cross talk on TV signal B due to TV signal A. But, there is a phase reversal of the color subcarrier in successive lines of the TV signal B due to alternate line delay unit 17 in FIG. 1. Therefore, the TV video signal B at point 33 in FIG. 2 is not suitable for application to a TV monitor or receiver because the color subcarrier switches back and forth between complementary cancelling colors at the 15,734 Hz line repetition rate. This color-cancelling effect is prevented by the intermediate line delay unit 34 in FIG. 2 which delays the intermediate lines of signal B which were not delayed by the alernate line delay unit 17 in FIG. 1. At the output 35 of the intermediate line delay unit 34, the color subcarrier in all lines of the TV signal B are delayed an equal amount, and consequently the color-cancelling effect of the alternate line delay unit 17 is offset by the intermediate line delay unit 34.

The video signal A at point 28 in FIG. 2, and the video signal B at point 35 may be applied to TV monitors and via broadcasting stations to TV receivers, where the TV signals will be displayed without humanly visible color flicker due to cross modulation of the two signals in the satellite repeater. However, there is an invisible high-frequency cross modulation of the two signals which is visible on cathode-ray-tube signal-monitoring instruments at TV signal distribution and control locations. These high-frequency perturbations can frustrate operators performing TV signal adjustment and control procedures, and it is therefore desirable to balance out the perturbations by passing the TV signals A and B through respective chroma averaging circuits 29 and 36.

FIG. 7 illustrates the action of chroma averaging circuit 29 through which the video signal A is passed. The chrominance component is averaged over three horizontal lines. Half of the intermodulation from a preceeding line $B_1$, all of the intermodulation from a next following line $B_2$ and half of the intermodulation from a present line $B_3$ are all added together to substantially cancel the intermodulation or cross modulation of the chrominance component of TV signal A by the chrominance component of TV signal B. The chroma averaging circuit 36 similarly cancels the cross modulation of the chrominance component of video signal B by the chrominance component of video signal A. The video signals A and B on output lines 30 and 37, respectively, are substantially free of both the high-frequency cross talk otherwise observable on instruments, and the low-frequency cross talk otherwise humanly visible on monitors and TV receiver screens.

What is claimed is:

1. In a system in which two color television video signals having slightly different color subcarrier frequencies are transmitted over a common channel, means to minimize the observable cross modulation of the two color subcarriers, comprising
    means at the transmitting end to delay alteranate lines of one of said video signals by the amount of half the period of the color subcarrier, and
    means at the receiving end to delay the intermediate lines of said one video signal by the amount of half the period of the color subcarrier,
    whereby the cross modulation of the color subcarrier in each video signal by the subcarrier in the other video is translated to fluctuations occurring at too high a rate to be visible on televison monitors and receivers.

2. A system as defined in claim 1, and in addition, chroma averaging means at the receiving terminal in the path of each video signal to average the chroma portions of a plurality of lines.

3. A system as defined in claim 2 wherein said chroma averaging means averages over two succeeding lines.

4. A system as defined in claim 2 wherein said chroma averaging means averages over three succeeding lines.

5. In combination,
    means to delay alternate lines of a color television video signal by half the period of the color subcarrier,
    means subsequently to delay intermediate lines of the video signal the same amount, and
    means thereafter to average the chroma portion of the resultant video signal over a plurality of lines.

* * * * *

UNITED STATES PATENT AND TRADEMARK OFFICE
CERTIFICATE OF CORRECTION

PATENT NO. : 4,120,001
DATED : October 10, 1978
INVENTOR(S) : Liston Abbott, et al.

It is certified that error appears in the above-identified patent and that said Letters Patent is hereby corrected as shown below:

Title page, line [22], change "Filed Dec. 17, 1976" to
---Filed Dec. 20, 1976---.

Column 5, line 23, change "fuctuations" to ---fluctuations---.
Column 6, line 27, change "alteranate" to ---alternate---.

Signed and Sealed this

Twenty-sixth Day of June 1979

[SEAL]

*Attest:*

RUTH C. MASON
*Attesting Officer*

DONALD W. BANNER
*Commissioner of Patents and Trademarks*